United States Patent
Etievant et al.

(10) Patent No.: US 6,245,309 B1
(45) Date of Patent: Jun. 12, 2001

(54) METHOD AND DEVICES FOR PRODUCING HYDROGEN BY PLASMA REFORMER

(75) Inventors: Claude Etievant, Versailles; Mustapha Roshd, Saint Nom la Bretèche, both of (FR)

(73) Assignee: H2-Tech S.A.R.L (FR)

( * ) Notice: Subject to any disclaimer, the term of this patent is extended or adjusted under 35 U.S.C. 154(b) by 0 days.

(21) Appl. No.: 09/331,746

(22) PCT Filed: Dec. 23, 1997

(86) PCT No.: PCT/FR97/02396
§ 371 Date: Jun. 24, 1999
§ 102(e) Date: Jun. 24, 1999

(87) PCT Pub. No.: WO98/28223
PCT Pub. Date: Jul. 2, 1998

(30) Foreign Application Priority Data

Dec. 24, 1996 (FR) .................................. 96 15944

(51) Int. Cl.$^7$ ................................. C01B 3/24; H05F 3/00
(52) U.S. Cl. .............................. 423/248; 204/164; 95/55; 96/7
(58) Field of Search ........................... 423/248; 204/164; 315/111.21; 96/4, 7; 95/55

(56) References Cited

U.S. PATENT DOCUMENTS 5,266,175 * 11/1993 Murphy ............................ 204/157.43
5,498,278 * 3/1996 Edlund ..................................... 96/11

FOREIGN PATENT DOCUMENTS

2724806 * 3/1996 (FR) .

OTHER PUBLICATIONS

Chapelle et al., French Patent abstract 2,724,860 Mar. 1996.*

* cited by examiner

Primary Examiner—Steven P. Griffin
Assistant Examiner—Maribel Medina
(74) Attorney, Agent, or Firm—Mason, Kolehmainen, Rathburn & Wyss (57) ABSTRACT

One of these devices comprises: a reaction with cold plasma (10b), for producing the reforming of a primary mixture consisting of fuel gas (hydrocarbon or alcohol), as well as oxygen and/or water vapor, thus producing a secondary mixture containing in particular hydrogen, carbon dioxide and carbon monoxide; an intake piece (18) for mixing these constituents, co-operating with a burner (42) and an associated combustion chamber (40) to bring the resulting primary mixture to a high temperature, before it is introduced into the reaction chamber (10a); a ring-shaped chimney (48) enclosing this chamber for maintaining it at a relatively high temperature; a high frequency alternating high voltage source (58), modulated by brief periodical low frequency pulses and electrodes (62–66) for generating silent discharges, in the reaction chamber (10b) thus generating a cold plasma producing a high chemical reactivity to the gas mixture present; a membrane (12) with high selective permeability for extracting the nascent hydrogen, arranged between the chamber (10b) and a chamber for collecting the hydrogen (14); a thermal insulating sheath (50) enclosing the whole set. The invention is applicable to PEM type fuel cells, fitted on electric vehicles or on portable generator set.

18 Claims, 5 Drawing Sheets

METHOD AND DEVICES FOR PRODUCING HYDROGEN BY PLASMA REFORMER

BACKGROUND OF THE INVENTION

1. Field of the Invention

The invention concerns a method and devices for producing hydrogen by a plasma reforming operation.

With regard to the devices, the invention concerns hydrogen generators that are easily transportable and relatively inexpensive, adapted to produce substantially pure hydrogen for any purpose. The main use of such generators is to feed fuel cells installed on electrical cars or incorporated in generator sets.

With regard to the method, the invention concerns the production of a gas flow containing hydrogen for feeding a fuel cell operating at low temperature from a primary gas mixture comprising a combustible gas and steam and/or oxygen or air.

2. Background of the Invention

Hydrogen generators of the kinds with which the invention is concerned include a reaction chamber that is maintained at all times at a relatively high temperature suitable for reforming a primary gas mixture placed in a reactional state. A primary mixture of this kind comprises a combustible gas (hydrocarbon, alcohol, carbon monoxide, etc), oxygen and/or steam. In the reaction chamber the primary mixture undergoes endothermic or exothermic reforming that is more or less complete and in accordance with chemical equations (1) to (4) below, which equations describe reforming a stoichiometric mixture of methane, oxygen and steam.

$$CH_4 + 2H_2O \rightarrow CO_2 + 4H_2 \rightarrow \text{strongly endothermic reaction} \quad (1)$$

$$CH_4 + H_2O \rightarrow CO + 3H_2 \rightarrow \text{moderately endothermic reaction} \quad (2)$$

$$CO + H_2O \rightarrow CO_2 + H_2 \rightarrow \text{moderately exothermic reaction} \quad (3)$$

$$CH_4 + O_2 \rightarrow CO_2 + 2H_2 \rightarrow \text{strongly exothermic reaction} \quad (4)$$

Similar equations can be written in the case of reforming a primary gas mixture containing another hydrocarbon or an alcohol.

Such reforming converts the primary gas mixture into a secondary gas mixture formed of hydrogen and carbon dioxide as well as, usually, carbon monoxide and a residue of unconverted primary mixture.

Equations (2) and (3) above describe the intermediate steps generally involved in reforming in accordance with equation (1).

Thus carbon monoxide is generally produced during any operation of reforming a hydrocarbon or an alcohol. Carbon monoxide is known to act as a poison for one particularly interesting type of fuel cell, operating at low temperature and including a solid polymer electrolyte (proton exchange membrane (PEM) cells). Consequently, additional processing of the secondary mixture is essential for eliminating the carbon monoxide if the hydrogen obtained is to be usable directly in this type of fuel cell.

A distinction can be drawn between prior art reforming reaction chambers that use chemical catalysts and those which use a hot plasma to constitute a reactional medium. The documents commented on hereinafter describe three types of reaction chamber.

U.S. Pat. No. 4,981,676, granted in 1991 to Minet et al., describes a method for reforming a primary gas mixture of methane and steam. The reforming is carried out in an annular reaction chamber of great length and small diameter containing a catalyst material consisting of nickel-coated granules. The outside wall of the reaction chamber is a metal sheath and its inside wall is a membrane having relatively selective permeability for hydrogen, consisting of a porous ceramic, formed of a plurality of layers of decreasing thickness and porosity from the inside to the outside, with a thin catalytic metal layer on the outside. The membrane constitutes the wall of a chamber for collecting the hydrogen produced. The reaction chamber is heated externally by gas burners.

The advantages of the above method are selective in situ extraction of the nascent hydrogen produced. This shifts the point of thermodynamic equilibrium of conversions in accordance with equations (1), (2) and (3) in the direction of a more complete reaction and increases the rate of reforming, i.e. the rate of conversion of methane to hydrogen. The method has many disadvantages, which include: (1) limited application to steam reforming, (2) relatively fast aging and deterioration of the catalysts, requiring them to be replaced periodically, (3) production of a gas mixture formed of $CO_2$, CO and $H_2$. Consequently, a method of the above kind must include at least one additional stage for producing either substantially pure hydrogen or a gas mixture containing hydrogen suitable for a fuel cell operating at low temperature.

A substantially identical result obtained in the laboratory is described in an article by E. Kikuchi published by ELSEVIER, in Catalysis Today 25 (1995), pages 333–337. In the above article, the reactor again includes a sheath enclosing an annular space containing a standard catalyst material and a selective hydrogen extraction membrane. The membrane is a composite material formed of a thin (5 to 13 microns thick) layer of palladium or palladium-silver alloy deposited on a hollow porous ceramic support. In this case the conversions described by equations (1), (2) and (3) above are complete if the pressure is 9 bars and the temperature is 500° C. This is because of the extraction of the nascent hydrogen produced, which shifts the thermodynamic equilibrium in the direction of more complete conversion. The drawbacks of this method are similar to those of the Minet patent.

Published European patent application No. 0 600 621 A1, filed by ROLLS-ROYCE in 1993, describes equipment for reforming a primary mixture of methane and steam which includes means for additional treatment of carbon monoxide contained in the secondary mixture produced. The equipment includes a reaction chamber including a significant mass of catalyst material adapted to assure endothermic conversion in accordance with equations (1) and (2). To this end the temperature in the reaction chamber is raised to a relatively high value by internal input of heat produced by partial oxidation of the methane by the exothermic reaction described by equation (4). Reactors containing a particular catalyst material assure additional slightly exothermic conversion of the carbon monoxide to carbon dioxide at relatively low temperature and in accordance with equation (3). This type of equipment, which is costly and bulky, is suitable for fixed industrial applications but not for transportable hydrogen generators.

Methods of producing hydrogen including hot plasma reforming of a mixture of hydrocarbons and steam are described in two further documents: (1) French patent application No. 94/11209 filed by Pompes Manu Entreprise et al. (called PME hereinafter) and (2) an article by O'Brien et al. of MIT published in an IEEE document in August 1996.

The PME reaction chamber uses a hot plasma produced by periodic electrical arcs sliding between two electrodes with a widening gap. The electrodes are connected to a permanent high voltage and are swept continuously by a relatively strong flow of the gas to be reformed. The sliding electrical arcs have a two-fold function, namely: ionizing the gases passing through the space between the electrodes and heating them to a high-level thermal equilibrium state (4,000 K to 10,000 K). The high-energy electrons created in this way stimulate the chemical reactivity of the gases concerned. On leaving the space between the electrodes these very hot gases, which are highly chemically reactive, are diluted in the remainder of the volume of the reaction chamber, which reduces their reactivity and their average temperature. Their final temperature is further reduced by virtue of the fact that the chamber is disposed in a hollow jacket through which The primary gas mixture flows and is thus preheated before it is injected into the chamber. Hydrogen and carbon monoxide are therefore produced at the same time. In operation, the PME reaction chamber uses a very large quantity of electricity to produce hydrogen. This makes this chamber entirely unsuitable for systems for producing electricity external use, whether transportable or not, especially as installing a prior art membrane that is selectively permeable to hydrogen in a PME chamber would not appear to be obvious to the skilled person.

The O'Brien reaction chamber uses a plasma torch producing a permanent electrical arc rotating between two coaxial electrodes connected to a high voltage supply. The functions and drawbacks of the O'Brien chamber are virtually the same as those of the electrical arc of the PME reaction chamber. Accordingly, this chamber is also unsuitable for producing a generator of substantially pure hydrogen.

SUMMARY OF THE INVENTION

A first object of the invention is to develop a method and to construct apparatus for producing highly pure hydrogen that can be used directly in a PEM type low temperature fuel cell.

A second object of the invention is to provide transportable hydrogen generators of high efficiency, in particular consuming little electricity, adapted to be installed on electrical cars or to be incorporated in electrical generator sets of small or medium power rating.

A third object of the invention is to develop a method and to construct apparatus for producing hydrogen using small amounts of catalyst materials.

In accordance with the invention, a method of producing a gas flow intended to feed a fuel cell operating at low temperature, from a primary gas mixture containing a combustible gas and steam and/or oxygen and/or air, in which said primary mixture, after preheating, is fed into a reaction area at a moderate temperature where a secondary gas mixture is produced, containing in particular hydrogen, carbon dioxide and, generally, carbon monoxide and a residue of primary mixture, is characterized in that said reaction is a cold plasma reforming operation and in that said reforming operation is followed either by a step of recovery of the hydrogen by extraction, using a membrane having a high selective permeability for hydrogen, or a step of recovering a mixture of hydrogen and carbon dioxide by oxidation of the carbon monoxide present in the secondary mixture obtained.

The above method makes it possible to produce substantially pure hydrogen, or at the least a gas mixture containing hydrogen, directly usable to feed a PEM type fuel cell operating at low temperature, under advantageous economic conditions.

A generator of substantially pure hydrogen in accordance with the invention comprises:

a reaction chamber for reforming a primary gas mixture formed of at least one combustible gas (hydrocarbon, alcohol or carbon monoxide), oxygen or air and/or steam to produce a secondary gas mixture including hydrogen and carbon dioxide and, generally, carbon monoxide and a residue of the injected primary mixture;

heating means associated with said chamber in order to establish and to maintain therein a relatively high average temperature suitable for the particular reforming to be effected;

and is characterized in that it includes:

means for generating a cold plasma in the reaction chamber, to constitute a reactive medium therein, adapted to stimulate the chemical reactivity of the gases present without significantly increasing the average temperature of those gases;

a membrane having a high selective permeability for hydrogen, forming a partition between the cold plasma reaction chamber and a chamber for collecting the hydrogen produced.

According to one particular feature of the invention the means for generating a cold plasma in the reaction chamber are adapted to create short, periodic, low-current electrical discharges therein.

The preamble of the above definition of a hydrogen generator in accordance with the invention specifies that any primary gas mixture containing at least one combustible gas, steam and/or air or oxygen can be used. In the absence of oxygen, a steam reforming operation is carried out in accordance with equations (1), (2), (3). In the absence of steam, partial oxidation of the combustible gas is carried out in accordance with equation (4). In the presence of oxygen and steam, the flowrates of the incoming gases can be adjusted to obtain auto-thermal reactions.

The means for heating the gases to be reformed are outside the reaction chamber (burners) or inside it (partial oxidation of the combustible gas), or both inside it and outside it, if this is necessary to optimize energy consumption.

The main feature of the invention is a novel combination of two means that have never been combined to construct a generator of substantially pure hydrogen. The two means are a cold plasma and a membrane that is highly selective for hydrogen.

A cold plasma, generated in a gas mixture comprises two very different populations: a population that is very much in the minority made up of high energy electrons and therefore at a very high temperature (1 to $5.10^4$ K) and the other, much more numerous, made up of ions, atoms, radicals and molecules and which remains at an average temperature (500 K to 1,000 K in the case of the invention), imposed by other means. The chemical reactivity of the gases concerned is then strongly stimulated, purely by virtue of the presence of this very small population of high-energy electrons uniformly produced and distributed throughout the gas mixture concerned. However, this small very hot population hardly modifies the average temperature of the mixture.

This property of a cold plasma is explained by the fact that in a medium of the above kind electron collisions can create populations of excited atoms and molecules, molecular ions and very chemically active radicals that are not normally encountered in a neutral gas. In all industrial hydrogen production installations that are currently operating, initiating and promoting of various chemical reactions in the initial mutual mixture (which is a priori stable) use an appropriate catalyst material. In a gas ionized by a cold plasma, the same reactions are triggered and/or accelerated merely by the presence of particularly active species generated by the plasma. Consequently, such reactions can be observed in the absence of any catalyst material, a cold plasma constituting a particular reactional medium, replacing the material and having the same functions, which it performs better in various respects.

One means of generating a cold plasma is to produce electrical discharges, in particular corona discharges, rather than electrical arcs, between two electrodes at a high potential difference and carrying a low current. Electrical arcs are known to occur between two electrodes dipping into a gas if the voltage applied to them briefly exceeds a particular threshold (for example 20 kV) set by the operating conditions. When the arc is established, the voltage between the electrodes becomes low and the current very high.

On the other hand, corona electrical discharges, which generate the cold plasma used in the context of the invention, remain in their own state and are not the initial phases of production of periodic electrical arcs described by PME. These corona discharges are generated by the periodic short voltages which have an amplitude either below or above the arc-striking threshold, although in the latter case the applied high voltage is always of insufficient duration to strike an arc.

The electrical energy supplied to the gases concerned to generate a cold plasma of this kind is very low (around 10%) compared to the total thermal energy which must be supplied to the gases to carry out the intended reforming.

The membrane highly selective to hydrogen forms a partition between the reaction chamber and the hydrogen collecting chamber and allows immediate extraction of the nascent hydrogen. The effect of this is to enable virtually complete reforming of the mixture concerned.

By virtue of the above arrangements, apparatus that is relatively compact, relatively inexpensive and consumes little electricity provides particularly efficient reforming of the primary mixture concerned and substantially pure hydrogen can be produced that can be used for direct feeding of fuel cells.

BRIEF DESCRIPTION OF THE DRAWINGS

The features and advantages of the invention will emerge more precisely from the following description of embodiments of the invention given by way of non-limiting example and with reference to the accompanying drawings, in which.

DETAILED DESCRIPTION OF THE PREFERRED EMBODIMENTS

Figure 1:
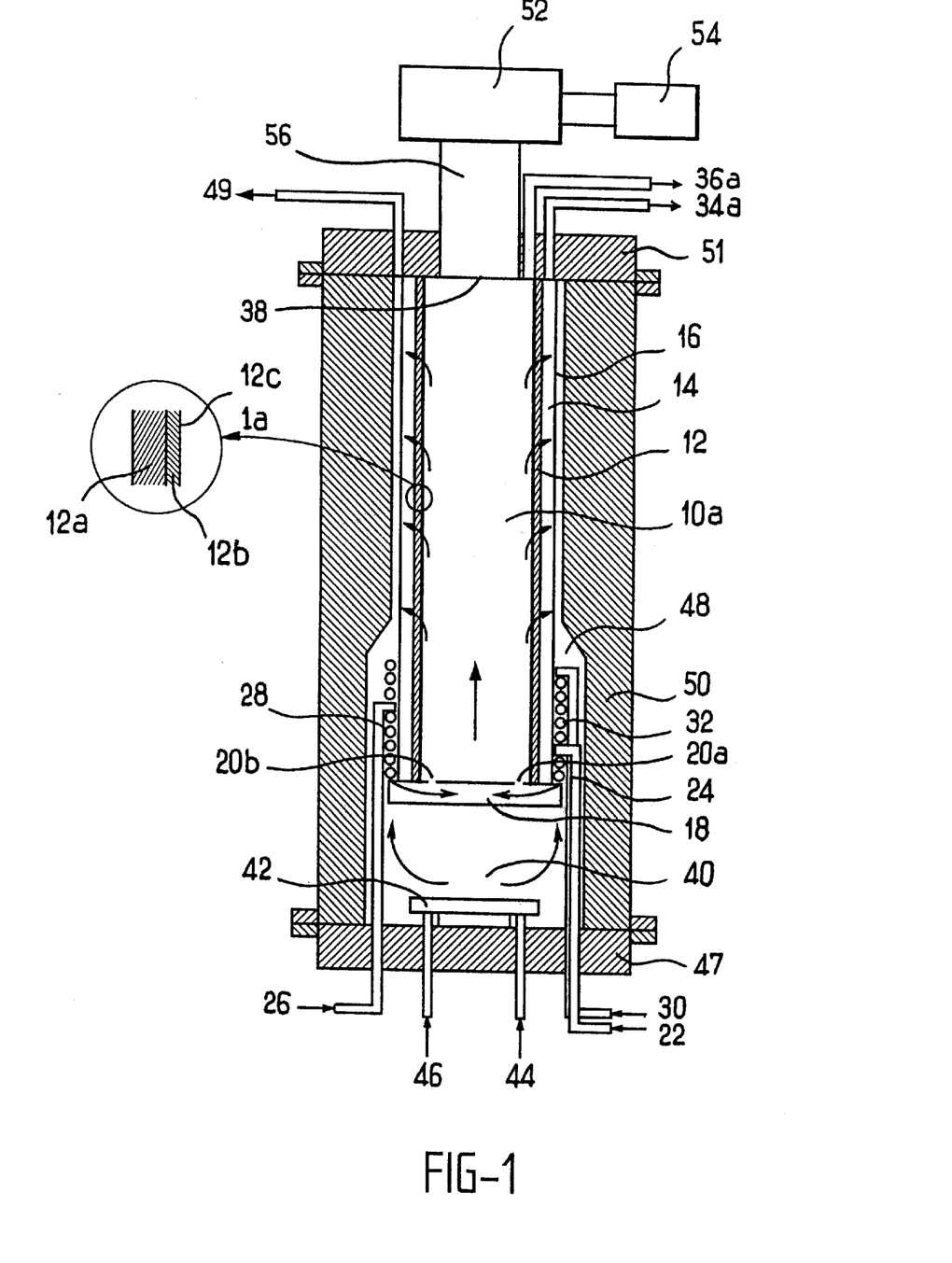
FIG. 1 is a diagrammatic longitudinal sectional view of a hydrogen generator including a reaction chamber in which a cold plasma is produced by microwaves, a membrane that is permeable to hydrogen surrounding the chamber.

FIG. 1 shows a cylindrical reaction chamber 10$a$ surrounded by a membrane 12 that is selectively permeable to hydrogen. The enlargement 1$a$ shows a partial section of one particular embodiment of the membrane 12. It comprises a relatively thick external support 12$a$ of porous ceramic (for example alumina) 2 mm thick, a thin coating 12$b$, usually 20 to 100 microns thick, of one of the metals known for their selective permeability to hydrogen and in particular: vanadium, niobium, palladium, palladium-silver or even silicon, and a mono-atomic non-metallic inner layer 12$c$, of carbon or sulfur, for example. This type of super-permeable membrane is described by A. I. Livshits in an article printed in "Journal of Nuclear Materials 170", 1990 (pages 79–92) published by North-Holland. Another embodiment of the membrane 12 does not have any mono-atomic non-metallic layer 12$c$. In this case, the metallic coating 12$b$ of the support 12$a$ is preferably ultra-thin, in other words has a thickness less than 20 microns. The membrane 12 is surrounded by an annular cylindrical chamber 14 for collecting hydrogen externally delimited by a metal wall 16 that is impermeable to hydrogen.

At the base of the reaction chamber 10$a$ is an entry part 18 with three functions, namely mixing, heating and injecting the reactive gases concerned. A turbulent flow of the gases is obtained by means of nozzles (not shown) suitably oriented for this purpose and mounted in openings 20$a$, $b$ in the ceiling of the part 18. The mixer 18 is connected (1) to a fuel (alcohol or hydrocarbon) supply conduit 22 via a spiral heat exchanger 24, (2) to a steam supply conduit 26 via a superheater 28 of the same kind, and (3) to an oxygen (or air) supply conduit 30 via another, similar heat exchanger 32.

Under the entry part 18 of the reaction chamber 10$a$ is a combustion chamber 40 at the base of which is a burner 42 fed with combustible gas mixture via a conduit 44 and with air via a conduit 46. The gases burned in the chamber 40 are evacuated via an annular chimney 48 which opens to the outside via an exhaust pipe 49 and which surrounds the hydrogen collecting chamber 14 and the heat exchangers 24, 28 and 32. The combustion chamber 40 and the annular chimney 48 are surrounded by a relatively thick thermally insulative jacket 50 made of silica wool, for example, and having a bottom 47 and a lid 51. A conduit 34$a$ removes hydrogen from the hydrogen collecting chamber 14. A conduit 36$a$ removes residual secondary mixture from the reaction chamber 10$a$. The top of the reaction chamber 10$a$ is closed by a window 38 that is permeable to microwaves.

To generate a cold plasma in the reaction chamber 10$a$ a microwave generator 52 (a magnetron operating at 3 GHz, for example) fed by a supply 54 delivering pulses of 20 to 30 kv at a frequency of 1 to 10 kHz and with a duration of a few microseconds is connected by a waveguide 56 to the window 38 in the chamber 10$a$. The chamber 10$a$ constitutes a resonant cavity for the microwaves applied to it and therefore has a longitudinal dimension equal to an integer number of half-wavelengths of the microwaves. Microwave electrical discharges are therefore created in the gas mixture concerned, similar to corona electrical discharges. To improve their efficacy, metal spikes insulated from each other can be installed in the reaction chamber.

Figure 2:
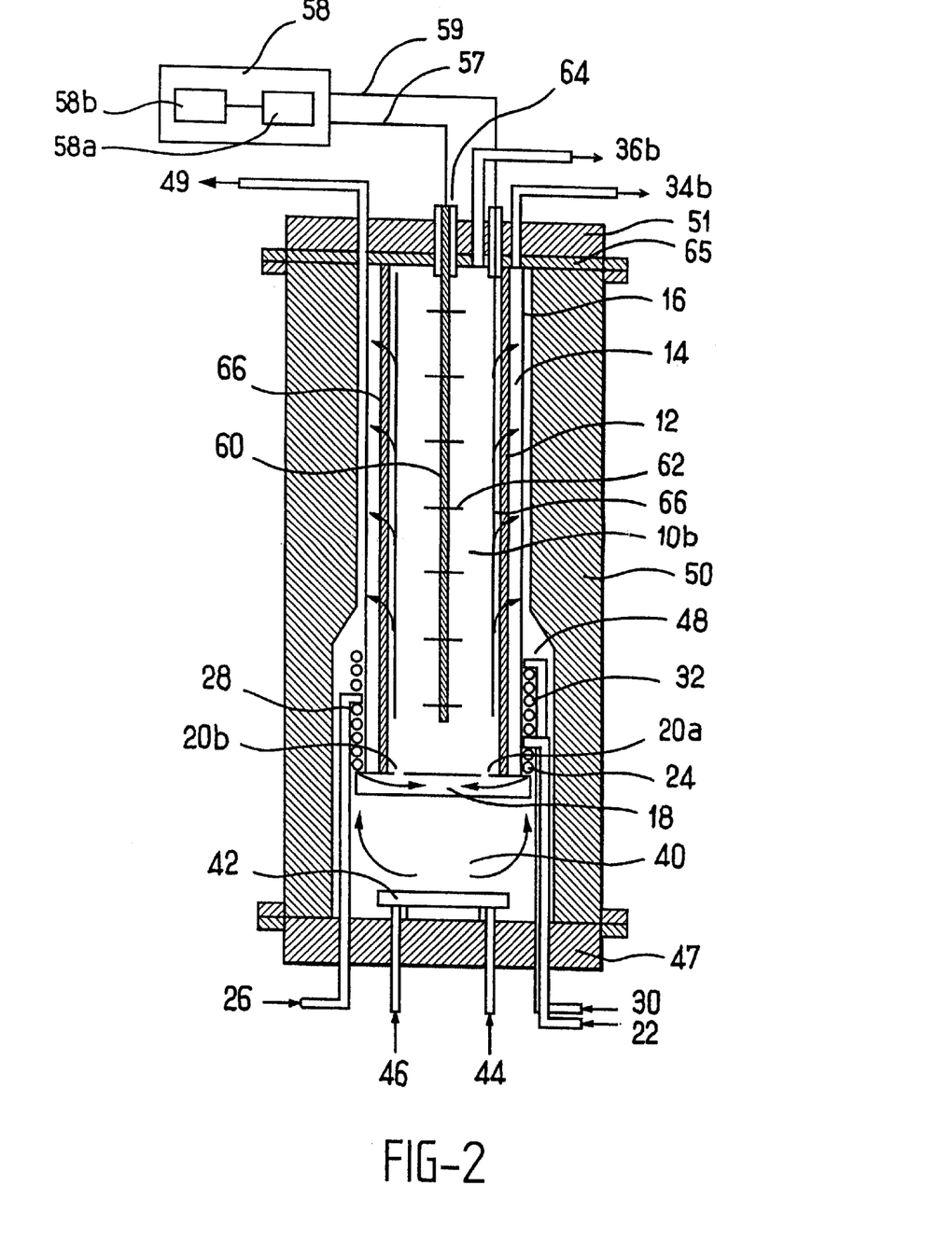
FIG. 2 is a diagrammatic longitudinal sectional view of a hydrogen generator including a reaction chamber in which a cold plasma is produced by pulsed corona discharge, a membrane that is permeable to hydrogen surrounding the chamber.

The reaction chamber 10b shown in FIG. 2 differs from that 10a shown in FIG. 1 in terms of the means for generating a cold plasma therein. Here these means comprise a supply 58 delivering a pulsed alternating high voltage and electrodes 62–66 respectively connected to the high voltage terminal of the supply and to ground. The supply 58 includes an HF generator 58a producing a high frequency which is modulated by an appropriate LF circuit 58b. For example, the supply 58 delivers an alternating high voltage with an amplitude of 10 to 20 kV at a frequency of approximately 1 MHz modulated by squarewave signals at a frequency of approximately 1 kHz and having a pulse duration of a few microseconds. The amplitude of the applied HF alternating voltages is generally slightly greater than the arc-striking threshold, the duration of the pulses (one half the HF period in each direction) obviously being too short to cause arcing. The number of HF periods in a modulation pulse and the exact value of the HF frequency are determined in accordance with the specific operating conditions. The frequency and/or duration of the modulation pulses is/are adjusted according to the average electrical power to be supplied to the gas to generate the required cold plasma.

The high voltage output terminal of the supply 58 is connected by a heavily insulated first conductor 57 to a rigid metal rod 60 disposed at the center of the reaction chamber 10b. The rod 60 carries radial electrodes 62 in the form of spikes. The relatively large number of spikes is regularly arranged along the rod 60, the total number of spikes and the optimum distance between their levels being determined by systemactic experimentation The rod 60 is rigidly fixed to a sealed passage 64 which is strongly electrically insulated and fitted into a flange 65 closing the reaction chamber 10b. A second conductor 59 connected to the ground of the supply 58 is connected to a circular section cylindrical fine metal grid 66. The grid 66 is installed in the reaction chamber 10b in the close vicinity of the inside face of the membrane 12. This causes corona discharges between the spike electrodes 62 and the grid 66.

The grid 66 is near the hydrogen extraction membrane 12 and is at ground potential rather than at the high potential of the supply 58. This is in order to prevent electrical discharges that would otherwise occur between the grid 66 and the membrane 12, necessarily connected to the ground of the entire apparatus. This would damage the thin metal layers that the membrane 12 surrounding the reaction chamber generally contains. As for the rod 60 supporting the spike electrodes 62 and fed with the very high alternating voltage from the supply 58, it should be noted that there is no significant stray electrical capacitance between the electrodes 62 and the ground of those components in parallel with the high impedance established between the electrodes 62 and the grid 66 before and during the required electrical discharges. This is because of the strongly insulated passage 64 of the rod 60 through the flange 65 and the relatively great distance between the electrodes 62 and the other components of the apparatus. This achieves production that is not disturbed by such discharges.

Because of the high frequency AC voltage delivered by the supply 58, a layer of insulating material having a high dielectric constant can be associated with one of the electrodes 62–66. If necessary, this layer is porous. This creates barrier discharges that are particularly effective in generating a cold plasma.

Figure 3:
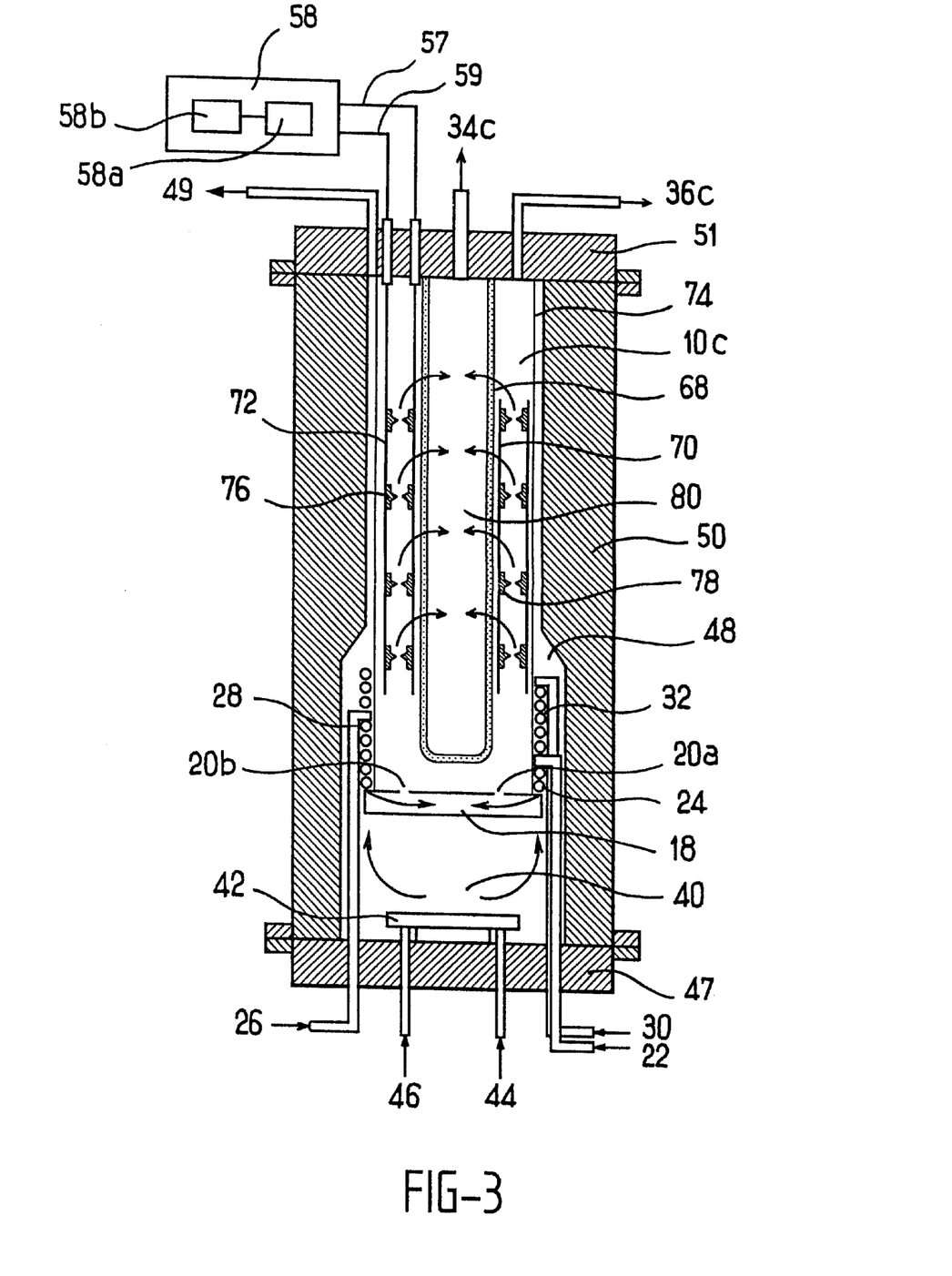
FIG. 3 is a diagrammatic sectional view of a hydrogen generator including a reaction chamber in which a cold plasma is produced between the electrodes by corona discharges, a membrane permeable to hydrogen being disposed in that chamber.

The reaction chamber 10c shown in FIG. 3 differs from that 10b shown in FIG. 2 primarily because a membrane 68 that is selectively permeable to hydrogen and in the shape of a closed ended tube is disposed at the center of the reaction chamber 10c. The wall of the membrane 68 is identical to the wall of either embodiment of the membrane 12 described above. The reaction chamber 10c contains metal grids 70–72, of cylindrical shape, for example, respectively connected to the conductors 57–59 connecting the voltage supply 58, with the result that the pulsed AC high voltage is applied to the grid 72 and ground, to the grid 70, which surrounds the membrane 68. The external wall 74 of the chamber 10c is an insulator impermeable to hydrogen and adapted to withstand the relatively high pressure in the reaction chamber 10c. The grid 72 is close to the wall 74 but there is no risk of provoking unwanted electrical discharges. At least one grid is equipped with radial electrodes 76–78. The interior of the membrane 68 is a chamber 80 for collecting hydrogen and has an axial evacuation conduit 34c. The interior of the membrane 68 is a chamber 80 for collecting hydrogen which has an axial outlet conduit 34c. The chamber 10c has an outlet conduit 36c for the residual secondary mixture.

Figure 4:
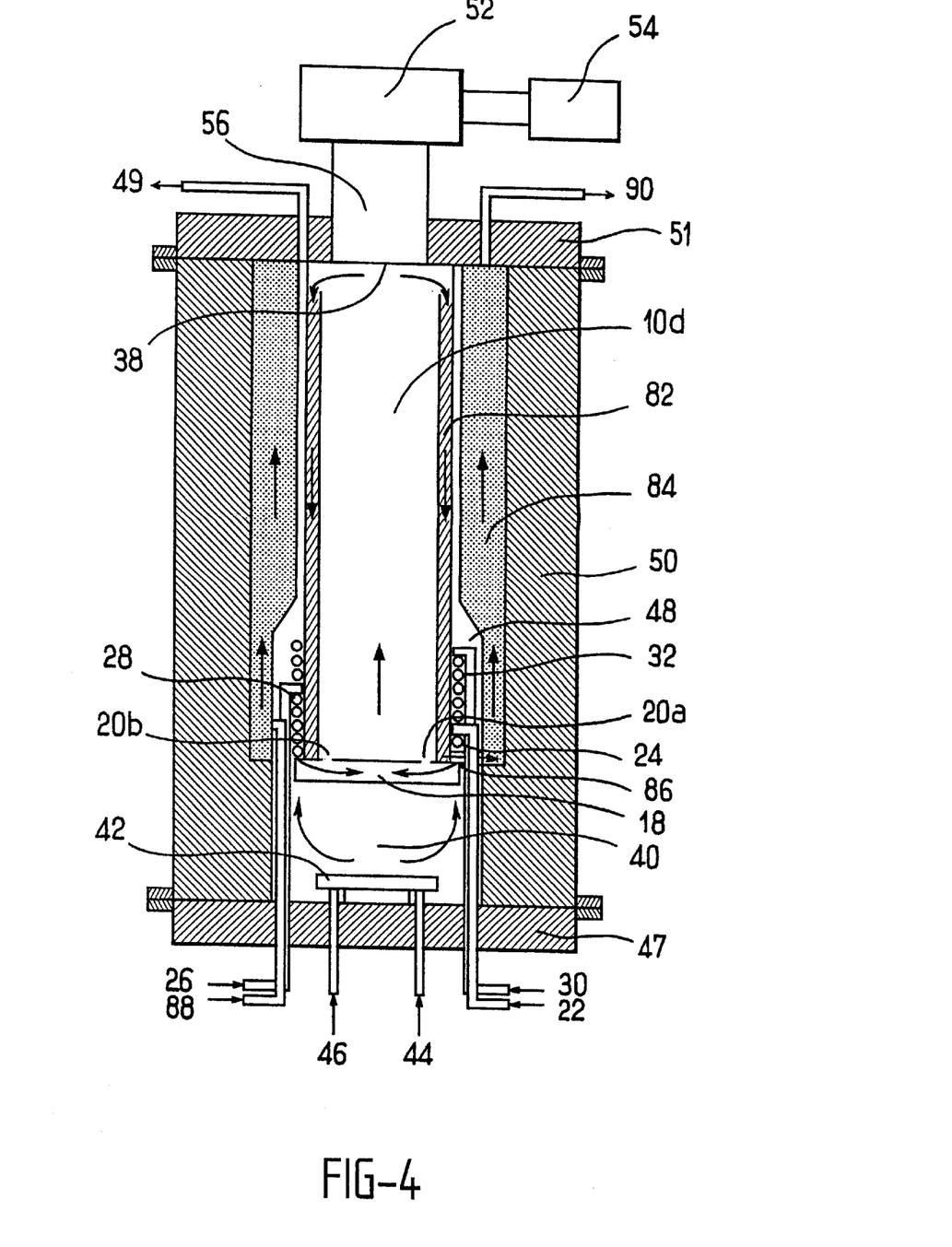
FIGS. 4 and 5 are diagrammatic sectional views of hydrogen generators including reaction chambers in which a cold plasma is respectively generated by microwaves and by pulsed corona discharge and means for treating the resulting secondary mixture comprising particular catalyst media respectively suited to completing the required conversion and oxidizing the carbon monoxide produced.
Figure 5:
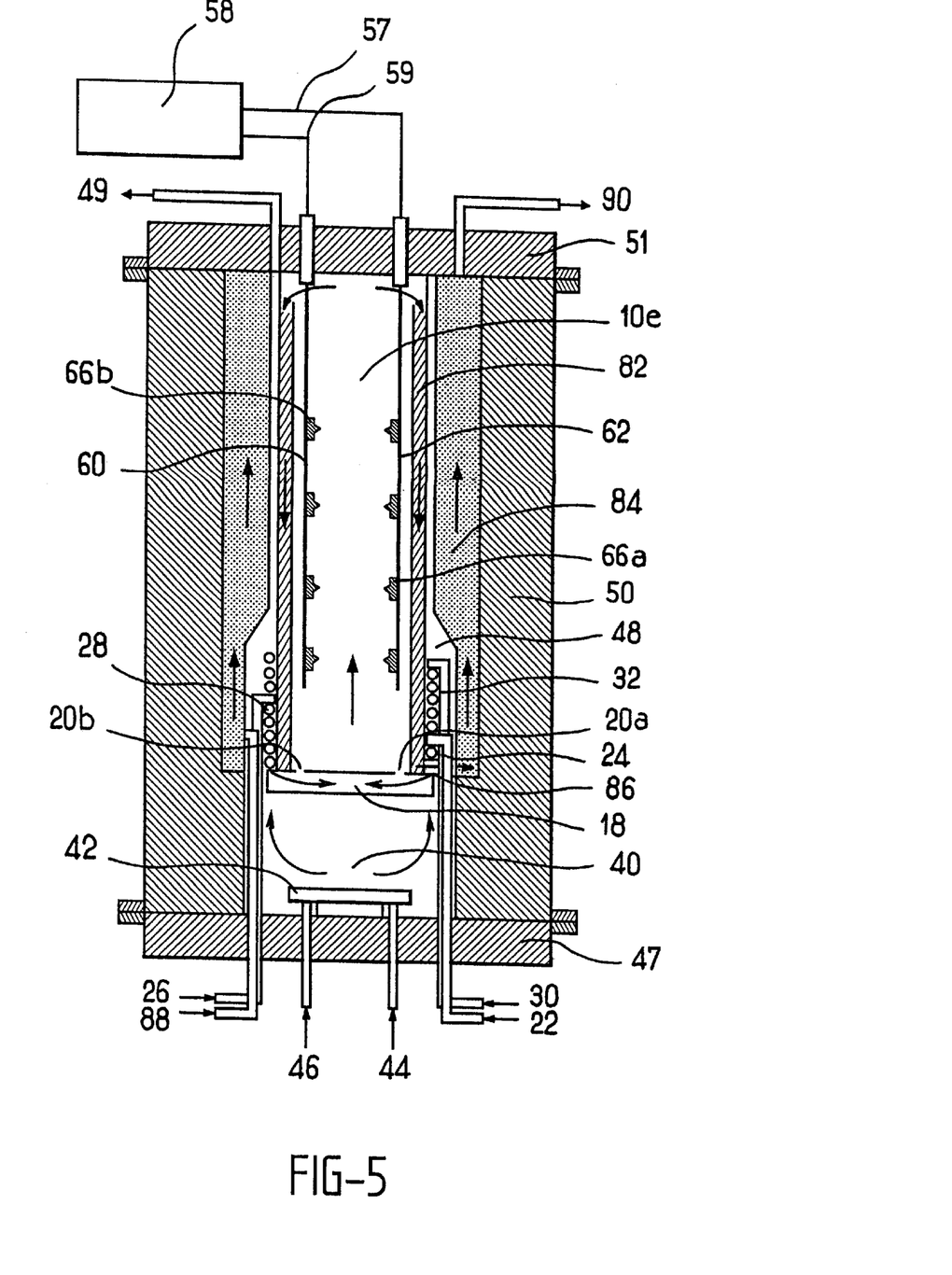

FIGS. 4 and 5 show two other embodiments of the invention that do not include any membrane for extracting the nascent hydrogen produced in the reaction chambers. In both cases the membrane is replaced by two annular spaces 82–84 coaxial with the reaction chambers 10d, e. Additional treatment of the secondary mixture produced in these chambers by reforming the primary mixture in accordance with equations (1) to (4) is performed in these spaces. The annular space 82 surrounds each reaction chamber 10d, e. The upstream end of this space communicates with the downstream end of this chamber. The space 82 is filled with nickel-coated granules, a catalyst for converting methane to hydrogen. The annular space 84 surrounds the annular chimney 48 of the combustion chamber 40. The base of the space 84 communicates with the downstream end of the space 82 via a conduit 86 and with an oxygen supply via a conduit 88. The annular space 84 is filled with platinum-coated granules, a catalyst for oxidizing carbon monoxide. An outlet conduit 90 for the treated secondary mixture is connected to the top of the annular space 84.

Referring to FIGS. 1, 2 and 3, the burner 42 is fed at 44 with a combustible gas mixture that could comprise the residual secondary gas mixture recovered from one of the outlet conduits 36a, b, c and additional fuel, possibly identical to that feeding the reaction chambers 10a, b, c at 22. The three heat exchangers 24-28-32 at the base of the annular chimney 48 of the combustion chamber 40 through which pass the three components of the primary mixture to be reformed (namely the combustible gas, the steam and the oxygen (or air) supplied via the conduits 22-26-30) preheat each component before feeding them into the entry part 18 of the reaction chamber 10a, b, c.

In the entry part 18 the three components are mixed completely and strongly heated by the flame of the burner 40. The required temperature of the primary mixture is around 500° C. if the fuel is methane or 250 to 300° C. in the case of methanol. Each fuel (including the methane mixed with the carbon monoxide, produced at the same time by apparatus for gasification of a heavy, liquid or solid fuel) has a temperature characteristic of its conversion into hydrogen. Consequently, the intensity of the flame of the burner 42 depends on the nature of the combustible gas to be reformed. The injector nozzles mounted in the openings 20a, b in the ceiling of the entry part 18 introduce a turbulent flow of the heated primary mixture into the reaction chamber 10a, b, c concerned. Efficient heat exchange is thereafter established between the totality of the primary mixture and the outside wall of the reaction chamber 10a, b, c concerned with which the mixture is in contact. This outside wall of the chamber 10a, b, c is directly (FIG. 3) or indirectly (FIGS. 1–2) heated by the burned gases flowing in the annular chimney 48 of the combustion chamber 40.

A cold plasma is created throughout the primary gas mixture present in the chambers by electrical discharges produced in the reaction chamber by pulsed microwaves (at 10a) or by electrodes 62–66 or 76–78 fed with pulsed AC high voltages (at 10b, c). This produces a secondary gas mixture as defined above. The membrane 12 (FIG. 1–2) or 68 (FIG. 3) which is selectively permeable to hydrogen extracts the nascent hydrogen as it is produced in the secondary mixture and transfers it into the hydrogen collecting chamber 14 or 80. This action of the selective membrane 12 or 68 also brings about positive displacement of the point of thermodynamic equilibrium of the reaction, as mentioned above. Also, the pressure in the chamber must be high enough to feed a fuel cell directly.

In the current state of the art of membranes selectively permeable to hydrogen available off the shelf, the maximum hydrogen production capacity of a cold plasma reaction chamber is significantly greater than the extraction capacity of any known membrane. Consequently, to obtain the greatest possible benefit from the methane to hydrogen conversion capabilities of cold plasma chambers, it is essential to maximize the hydrogen extraction capacity of the membranes concerned, in particular by increasing the surface area of those membranes.

The benefit of a generator of substantially pure hydrogen in accordance with the invention is therefore obvious. Compared to apparatus with the same function currently used in industry, a generator in accordance with the invention has: (1) much lower overall dimensions and weight, (2) significantly lower operating temperatures, (3) a consequently reduced heating energy , (4) minimum maintenance requirements, (5) a relatively low overall cost, and (6) the possibility of being easily installed in mass-produced electrical cars or readily transportable small and medium-power electrical generator sets.

A relatively large gassification unit must be used if gas oil, coal or wood is to be used to fire a fixed electrical power station of relatively high power and high energy efficiency comprising a generator of substantially pure hydrogen in accordance with the invention and a fuel cell.

Referring to FIGS. 4 and 5, reactors using catalysts, complementary to the cold plasma reaction chambers, are used to treat the secondary mixture produced and render it directly usable in certain types of fuel cell, other than the PEM type, operating at relatively high temperatures. The annular reactor 82 containing nickel-coated granules completes the conversion of the methane to hydrogen effected in the cold plasma chambers 10d, e. The annular reactor 84, which contains platinum-coated granules and receives oxygen, oxidizes the carbon monoxide contained in the secondary mixture passing through it to convert it into carbon dioxide. The two hydrogen generators shown in FIGS. 4–5 are improved forms of apparatus in accordance with the invention that have advantages over prior art apparatus with the same function. They are smaller and less costly. They are suitable for fixed or relatively untransportable medium-power installations.

The invention is not limited to the embodiments and applications described.

Generators of substantially pure hydrogen in accordance with the invention are obviously not intended only for feeding fuel cells. These generators are particularly suitable for equipping industrial and university chemistry laboratories. In this application they are preferably fed with natural gas from the gas main.

A plurality of membranes 68 selectively permeable to hydrogen and in the form of closed ended tubes could be installed in the same cold plasma reaction chamber. In this case the plasma is generated between two groups of electrodes insulated from each other and respectively connected to the high voltage supply and to ground. The two groups of electrodes are preferably similar to those described above, in particular metal grids or metal rods carrying spikes. They are installed in the reaction chamber to suit the arrangement of the membranes adopted. In this way, for a given volume of the reaction chamber, the surface area of the membranes and therefore the total capacity for extraction of hydrogen are increased. The hydrogen collecting chambers of these membranes are connected to a single removal conduit external to the reaction chamber.

The porous support 12a of the membranes 12 and 68 that are selectively permeable to hydrogen need not be of ceramic. Any porous refractory solid material is suitable for a support of this kind.

The two steps characteristic of the method in accordance with the invention of producing a gas flow containing hydrogen either alone or mixed with carbon dioxide for directly feeding a fuel cell operating at low temperature need not be implemented in the same apparatus. In this case, adequate treatment of the secondary gas mixture produced by the first apparatus is carried out in second apparatus near the first apparatus.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A generator of substantially pure hydrogen, including:
   a reaction chamber into which is injected a primary gas mixture formed of at least one combustible gas selected form the group consisting of a hydrocarbon, an alcohol and carbon monoxide, and steam and/or oxygen and/or air; wherein the generator further includes:
      heating means being associated with the reaction chamber in order to establish and to maintain therein a predetermined average temperature;
      means for producing in the reaction chamber electrical discharges at a current which is low enough to prevent the formation of electric arcs so as to generate a cold plasma adapted to stimulate the chemical reactivity of the primary gas mixture without significantly increasing the average temperature of those gases in order to reform the primary gas mixture to produce a secondary gas mixture containing hydrogen, carbon dioxide, carbon monoxide and a residue of the primary gas mixture; and
      means for removing hydrogen from the secondary gas mixture.

2. A hydrogen generator according to claim 1 wherein the means for removing the hydrogen from the secondary gas mixture comprise a membrane having a high selective permeability for hydrogen disposed as a separator partition between the reaction chamber and a chamber for collecting the hydrogen produced.

3. A hydrogen generator according to claim 1 wherein the heating means comprise a burner which is fed with a gas mixture comprising said combustible gas.

4. A hydrogen generator according to claim 1 wherein the means for producing low current electrical discharges in the reaction chamber comprise:

two electrodes insulated from each other, disposed in the reaction chamber and respectively connected by conductors to the high voltage and ground terminals of a high voltage supply delivering periodic short pulses having an amplitude which is either less than the arc-striking threshold or greater than that threshold but of insufficient duration to strike an arc;

the electrode to which the voltage is applied is strongly insulated from the general ground of the equipment.

5. A hydrogen generator according to claim 4, wherein the supply comprises:

an HF circuit producing a high frequency alternating voltage at a frequency in the order of 1 MHz and having a maximum amplitude of a few kilovolts;

an LF circuit producing short pulses having a frequency in the order of 1 kHz and a duration of a few microseconds, applied as modulating pulses to the HF circuit.

6. A hydrogen generator according to claim 1 wherein the means for producing low current electrical discharges in the reaction chamber comprise:

a microwave generator fed by a high voltage supply modulated by short periodic pulses having a frequency in the order of 1 kHz and a duration of a few microseconds;

the longitudinal dimension of the reaction chamber is an integer number of half-wavelengths of the microwaves produced.

7. A generator of substantially pure hydrogen according to claim 2 wherein the membrane which is highly selectively permeable to hydrogen comprises:

a hollow support having a relatively thick wall made of a porous solid refractory material; and an ultra-thin coating of a metal permeable to hydrogen deposited on the face of the support constituting a wall of the reaction chamber.

8. A generator of ultra-pure hydrogen according to claim 2 wherein the membrane having a highly selective permeability to hydrogen comprises:

a hollow support having a relatively thick wall made of a solid porous refractory material;

a thin coating of a metal permeable to hydrogen deposited on the face of the support serving as a wall of the reaction chamber;

said coating being provided on the outside with a monoatomic non-metallic layer such as sulfur or carbon so that the membrane can behave as a superpermeable membrane for nascent atomic hydrogen produced during reforming.

9. A hydrogen generator according to claim 4 wherein:

the means for removing the hydrogen from the secondary gas mixture comprise a membrane having a high selective permeability for hydrogen disposed as a separator partition between the reaction chamber and a chamber for collecting the hydrogen produced, the membrane which is selectively permeable to hydrogen surrounds the reaction chamber and constitutes its outside wall;

a rigid metal rod firmly mounted on a strongly electrically insulated sealed passage at the center of the reaction chamber carries a large number of radial electrodes and is connected to the high voltage supplied by the supply;

a metal grid in the close vicinity of the membrane is connected to the ground of the supply.

10. A hydrogen generator according to claim 4 wherein:

the means for removing the hydrogen from the secondary gas mixture comprise a membrane having a high selective permeability for hydrogen disposed as a separator partition between the reaction chamber and a chamber for collecting the hydrogen produced, the reaction chamber surrounds the membrane that is selectively permeable to hydrogen;

the membrane is in the shape of a closed ended tube and encloses a hydrogen collecting chamber;

the outside wall of the chamber is electrically insulating;

a first electrode connected to the high voltage of the supply is disposed in the near vicinity of the wall; and a second electrode connected to the ground of the supply is disposed in the near vicinity of the membrane.

11. A hydrogen generator according to claim 10 wherein the generator includes, in the same reaction chamber, a plurality of membranes in the shape of closed ended tubes and a plurality of associated groups of electrodes, the disposition, shape and number of the electrodes depending on the disposition of the membrane adopted.

12. A generator of substantially pure hydrogen according to claim 1 wherein:

the reaction chamber has at the base an entry part provided with a bottom and a ceiling and adapted to mix and heat gases to constitute said primary mixture;

said bottom being exposed to the flame of a burner in a combustion chamber;

said ceiling incorporating openings fitted with nozzles adapted to inject a turbulent flow of the resulting heated primary gas mixture into the reaction chamber.

13. A hydrogen generator according to claim 12 wherein:

the combustion chamber includes an annular chimney surrounding the reaction chamber;

heat exchangers fed with respective components of the primary gas mixture to be obtained are disposed at the base of said chimney and discharge into the entry part;

a thermally insulative jacket surrounds the combustion chamber and the annular chimney.

14. A generator of relatively pure hydrogen according to claim 1 wherein the means for removing hydrogen from the secondary gas mixture include:

two additional reaction chambers disposed in series around and after the reaction chamber, said additional chambers containing respective catalysts adapted to improve said reforming and then to eliminate the carbon monoxide from said secondary gas mixture in order to produce a final gas mixture formed principally of hydrogen and carbon dioxide.

15. A hydrogen generator according to claim 14 wherein said additional chambers comprise:

a first annular space sharing a wall with the reaction chamber;

a second annular space around the first one and separated from it by an annular chimney associated with the combustion chamber;

the first space contains a first catalyst adapted to complete the reforming carried out in the reaction chamber;

the second space contains a second catalyst adapted to convert carbon monoxide into carbon dioxide;

the upstream and downstream sides of the first space respectively communicate with the downstream side of the reaction chamber and with the upstream side of the second space;

the upstream and downstream sides of the second space are respectively connected to an oxygen or air supply conduit and to a conduit for removing the final gas mixture obtained in this way;

a thermal protection jacket surrounds said second space.

16. A method of producing a flow of gas consisting mainly of hydrogen for feeding a fuel cell from a primary gas mixture formed of a combustible gas and steam and/or oxygen and/or air, wherein the method includes the steps of:

(a) heating the primary gas mixture which is fed into a reaction zone at a temperature suitable for reforming the primary gas mixture, (b) producing in the reaction zone a cold plasma generated in the primary gas mixture by electric discharges at a current which is low enough to prevent the formation of electric arcs, which triggers a reaction of reforming the primary gas mixture and which produces a secondary gas mixture formed in particular of hydrogen, carbon dioxide, carbon monoxide and a residue of primary mixture, and (c) extracting the hydrogen from the secondary gas mixture.

17. A method of producing a flow of gas consisting mainly of hydrogen according to claim 16 wherein the hydrogen is extracted by means of a membrane having a high selective permeability for hydrogen.

18. A method of producing a gas flow consisting mainly of hydrogen according to claim 16 wherein the hydrogen is extracted by oxidizing the carbon monoxide present in the secondary mixture obtained and recovering a mixture comprising hydrogen and carbon dioxide.

* * * * *